United States Patent [19]

Matsufuji et al.

[11] 4,444,850

[45] Apr. 24, 1984

[54] MAGNETIC RECORDING MEDIUM WITH TITANATE COUPLING AGENT

[75] Inventors: Akihiro Matsufuji; Hideomi Watanabe; Mashahi Aonuma, all of Kanagawa, Japan

[73] Assignee: Fuji Photo Film Co., Ltd., Kanagawa, Japan

[21] Appl. No.: 308,720

[22] Filed: Oct. 5, 1981

[30] Foreign Application Priority Data

Oct. 3, 1980 [JP] Japan ............................. 55-138427

[51] Int. Cl.$^3$ ............................................. B32B 33/00
[52] U.S. Cl. .................................... 428/694; 428/900
[58] Field of Search ............... 427/128, 132; 428/692, 428/694, 695, 900, 702; 252/62.54; 260/42.14; 106/308 R, 308 B, 308 M, 308 Q

[56] References Cited

U.S. PATENT DOCUMENTS

| 4,165,232 | 8/1979 | Jaeckh et al. | 75/0.5 AA |
| 4,261,913 | 4/1981 | Monte et al. | 106/288 Q |
| 4,323,596 | 4/1982 | Buxbaum et al. | 428/900 |

*Primary Examiner*—Marion McCamish
*Attorney, Agent, or Firm*—Sughrue, Mion, Zinn, Macpeak and Seas

[57] ABSTRACT

A magnetic recording medium comprising a non-magnetic base and an overlying magnetic coating having ferromagnetic particles dispersed in a binder is disclosed. The magnetic coating is characterized by further containing a titanate coupling agent.

6 Claims, No Drawings

MAGNETIC RECORDING MEDIUM WITH TITANATE COUPLING AGENT

FIELD OF THE INVENTION

This invention relates to an improved magnetic recording medium.

BACKGROUND OF THE INVENTION

Ferromagnetic particles are used in magnetic recording media such as audio tape, video tape, memory tape, magnetic sheet and magnetic card, and ferromagnetic iron oxide, cobalt ferrite, ferromagnetic chromium dioxide particles, or fine ferromagnetic metal particles and ferromagnetic metal films are used as these ferromagnetic particles. With the increasing importance of systems for high-density recording of short wavelength signals, the ferromagnetic particles are required to have magnetic recording characteristics suitable for high-density recording (e.g., high coercive force and great residual flux density). Although fine ferromagnetic metal particles are considered to be best suited for this purpose, they inherently have a tendency to be oxidized and their magnetic properties are deteriorated more easily than the magnetic oxide particles. Furthermore, the ferromagnetic metal particles have higher coercive force than the magnetic oxide particles and hence are unable to form an equally good dispersion.

SUMMARY OF THE INVENTION

Therefore, one object of this invention is to provide a magnetic recording medium having good magnetic properties.

Another object of this invention is to provide magnetic recording particles having magnetic properties less susceptible to time-dependent change.

Still another object of this invention is to provide a process for producing a magnetic recording medium using an improved step for creating a dispersion.

As a result of various studies to achieve these objects, we have found that greatly improved results are achieved by incorporating a titanate coupling agent in a magnetic layer containing ferromagnetic particles or by using ferromagnetic particles whose surface is treated with a titanate coupling agent. This invention provides a magnetic recording medium that comprises a nonmagnetic base and an overlying magnetic layer having ferromagnetic particles dispersed in a binder. The magnetic layer is characterized by further containing a titanate coupling agent.

DETAILED DESCRIPTION OF THE INVENTION

The titanate coupling agent as used in this invention is an ether type organometallic compound which is illustrated by the following compounds.

Isopropyl triisostearoyltitanate

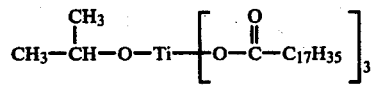

Isopropyl trioctanoyltitanate

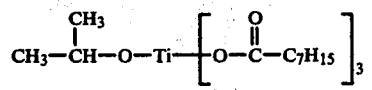

-continued

Isopropyl diisostearoylcumylphenyltitanate

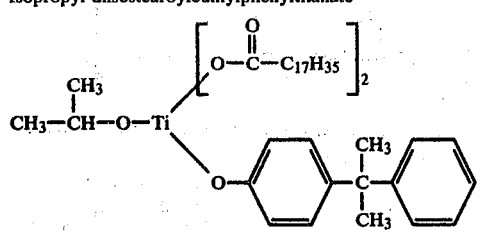

Isopropyl distearoylmethacryltitanate

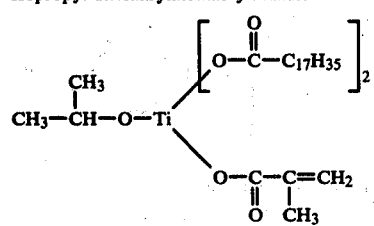

Isopropyl dimethacrylisostearoyltitanate

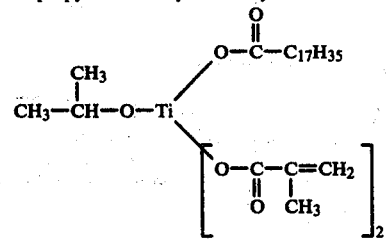

Isopropyl tridodecylbenzenesulfonyltitanate

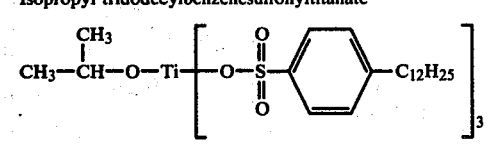

Isopropyl diisostearoylacryltitanate

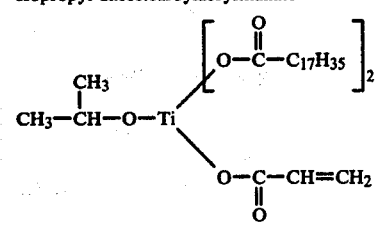

Isopropyl isostearoyldiacryltitanate

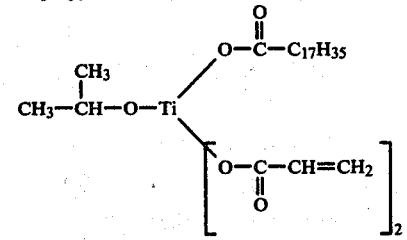

Isopropyl tri(dioctylphosphate)titanate

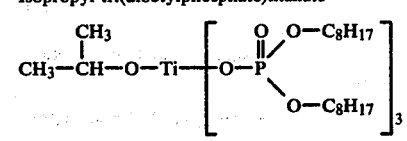

Isopropyl tri-n-stearoyltitanate

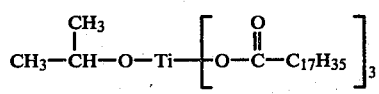

Isopropyl 4-aminobenzenesulfonyl-di(dodecylbenzenesulfonyl)titanate

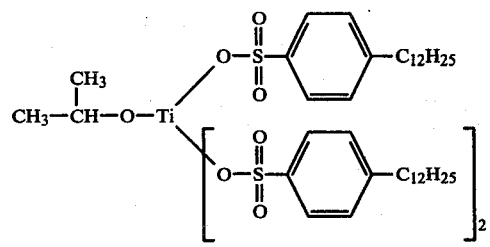

Isopropyl trimethacryltitanate

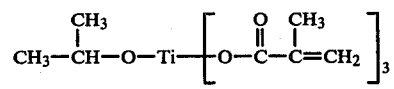

Isopropyl tricumylphenyltitanate

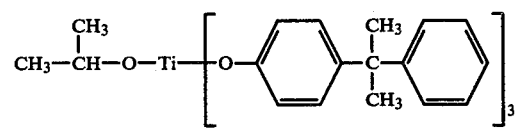

Isopropyl di(4-aminobenzoyl)isostearoyltitanate

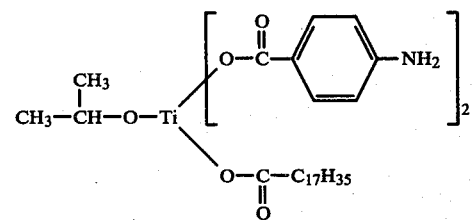

Isopropyl tri(dioctylpyrophosphate)titanate

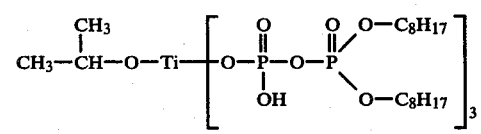

Isopropyl triacryltitanate

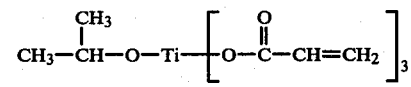

Isopropyl tri(N,N—dimethyl-ethylamino)titanate

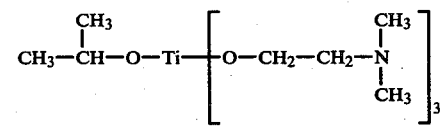

Isopropyl tri(N—ethylamino-ethylamino)titanate

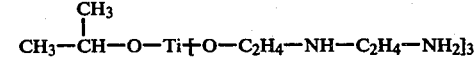

Isopropyl trianthranyltitanate

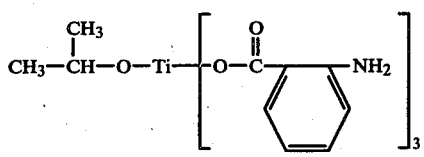

Isopropyl tri(octylbutylpyrophosphate)titanate

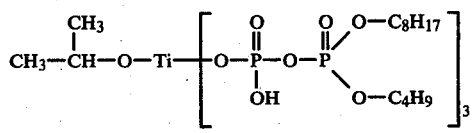

Isopropyl tri(butylmethylpyrophosphate)titanate

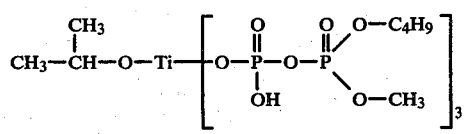

Diisostearoyl oxyacetatetitanate

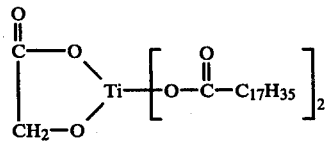

Isostearoyl methacryloxyacetatetitanate

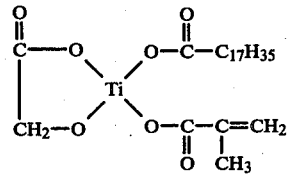

Isostearoyl acryloxyacetatetitanate

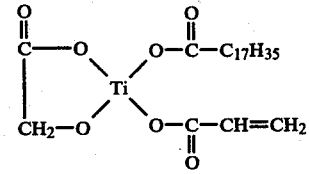

Di(dioctylphosphate)oxyacetatetitanate

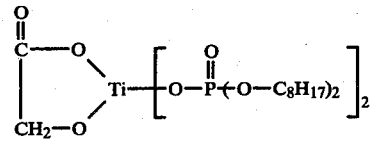

4-Aminobenzenesulfonyldodecylbenzenesulfonyloxyacetatetitanate

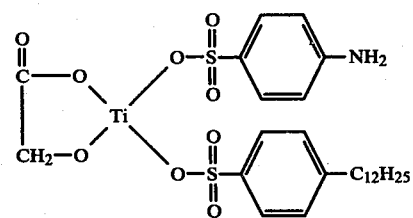

Dimethacryloxyacetatetianate

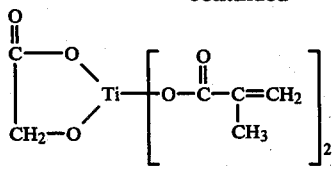

Dicumylphenolateoxyacetatetitanate

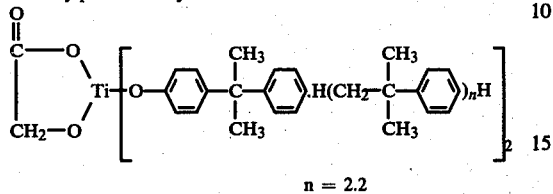

n = 2.2

4-Aminobenzoylisostearoyloxyacetatetitanate

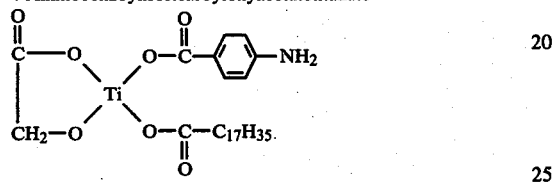

Di(dioctylpyrophosphate)oxyacetatetitanate

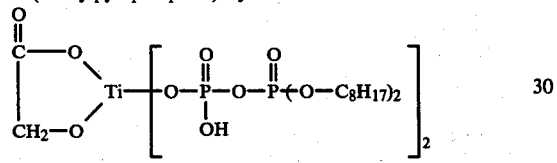

Diacryloxyacetatetitanate

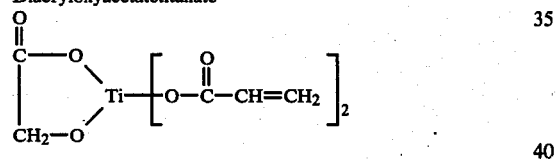

Di(octylbutylpyrophosphate)oxyacetatetitanate

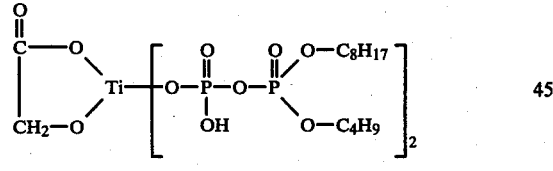

Diisostearoylethylenetitanate

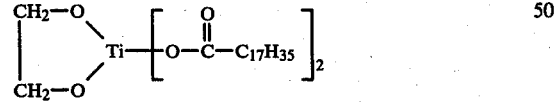

Isostearoylmethacrylethylenetitanate

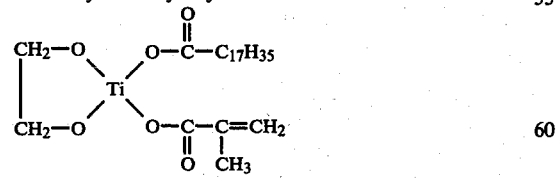

Di(dioctylphosphate)ethylenetitanate

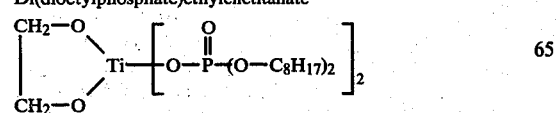

4-Aminobenzenesulfonyldodecylbenzenesulfonylethylenetitanate

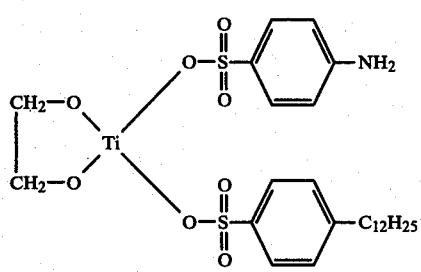

Dimethacrylethylenetitanate

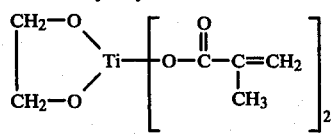

4-Aminobenzenesulfonylisostearoylethylenetitanate

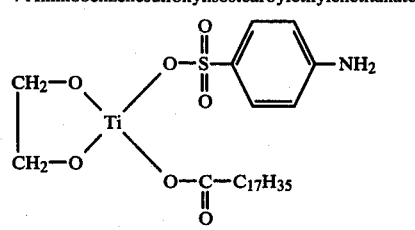

Di(dioctylpyrophosphate)ethylenetitanate

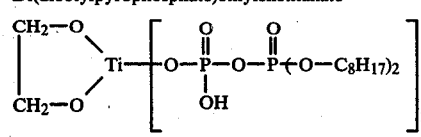

Diacrylethylenetitanate

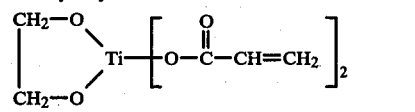

Dianthranylethylenetitanate

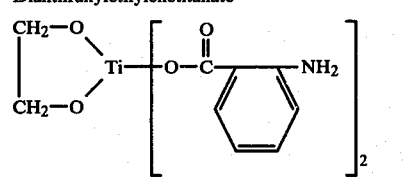

Di(butylmethylpyrophosphate)ethylenetitanate

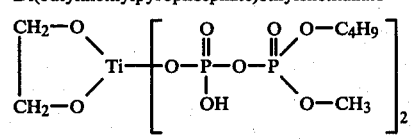

In this invention, titanate coupling agents represented by the following formula are preferably used:

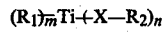

wherein $R_1$ represents an alkoxy group having 1 to 10 carbon atoms, X represents carbonyloxy group, sulfonyloxy group, sulfinyloxy group, phosphate group, pyrophosphate group, oxy group, thioxy group or the like, $R_2$ represents an alkyl group having 1 to 30 carbon atoms, an alkenyl group having 1 to 30 carbon atoms or an aryl group, which may be substituted, and n and m are integer of 1 to 3 wherein n+m is 4.

The above-listed titanate coupling agents are commercially available under the trade names "Ken-react" (from Kenrich Petrochemical Corp., U.S.A.) and "Plain-act" (from Ajinomoto Co., Inc., Japan). The titanate coupling agents according to this invention may be used independently or in combination. They are used preferably in an amount of from 0.01 to 10 wt% of the magnetic particles.

The surface of the magnetic particles may be treated with these titanate coupling agents by mixing the particles with an organic solvent having the titanate coupling agent dissolved therein and removing the solvent from the resulting slurry either by filtration or by drying under vacuum. By so doing, the surface of the magnetic particles can be reacted with the titanate coupling agent of this invention before the magnetic particles are incorporated in a magnetic layer. The surface treatment of the magnetic particles provides better results than the addition of the coupling agent to the magnetic layer, and this tendency is particularly conspicuous when ferromagnetic metal particles are used.

Tetraisopropyl titanate, tetrastearyl titanate and polybutyl titanate are described in Japanese Patent Publication No. 4804/80 as compounds similar to the titanate coupling agent of this invention. However, these titanates are polyfunctional titanate coupling agents and are not preferred for use in this invention because they easily undergo hydrolysis or alcoholysis and at the same time they are gradually condensed into a high-molecular polymer. In other words, the titanate coupling agent of this invention is monofunctional or bifunctional and has high stability and is least likely to be polymerized. It is believed that the titanate coupling agent of this invention reacts with hydroxy group or adsorbed water at the surface of the magnetic particles to render the surface oleophilic, and because of the small number of functional groups present, the titanate coupling agent of this invention achieves more uniform protection of the surface of the magnetic particles. Accordingly, it prevents deterioration of their magnetic properties and helps provide a uniform dispersion of the magnetic particles. Preferably, the titanate coupling agent of this invention does not contain sulfur in the molecule.

The ferromagnetic particles, binder and a coating solvent as the principal components of the magnetic recording medium of this invention are mixed thoroughly with a dispersant, lubricant, abrasive, antistatic agent or other suitable additives to form a magnetic coating solution. This solution is applied to a base, followed by orientation of the magnetic particles, drying and calendering to provide the desired magnetic recording medium.

The binder to be used in this invention is a conventional thermoplastic resin, thermosetting resin (or reactive resin) or a mixture of these resins. Examples of the thermoplastic resin are vinyl chloride/vinyl acetate copolymer, vinyl chloride/vinylidene chloride copolymer, vinylidene chloride/acrylonitrile copolymer, vinyl chloride/acrylonitrile copolymer, (meth)acrylic acid ester/acrylonitrile copolymer, (meth)acrylic acid ester/vinylidene chloride copolymer, (meth)acrylic acid ester/styrene copolymer, urethane elastomer, urethane resin, polyvinyl fluoride, butadiene/acrylonitrile copolymer, polyamide resin, polyvinyl acetal resin, cellulose derivatives (e.g., cellulose acetate butyrate, cellulose diacetate, cellulose triacetate, cellulose propionate, cellulose acetate propionate, and nitrocellulose), styrene/butadiene copolymer, polyester resin, and other suitable thermoplastic resins. Of these, vinyl chloride/vinyl acetate copolymer, urethane resin and cellulose derivatives are preferred.

The thermosetting resin or reactive resin is such that its molecular weight is increased infinitely by condensation or addition reaction upon heating or irradiation with light. Examples are phenolic resin, epoxy resin, polyurethane curable resin, urea resin, melamine resin, and acrylic acid ester resin, with a thermosetting polyurethane resin being preferred. To provide higher durability, a polyisocyanate compound may be added as a cross-linking agent. These binders may be used independently or in combination. The mixing ratio of the ferromagnetic particles to the binder is 8 to 25 parts by weight of the binder per 100 parts by weight of the magnetic particles.

The ferromagnetic particles include ferromagnetic iron oxides such as gamma-$Fe_2O_3$, $Fe_3O_4$, or gamma-$Fe_2O_3$ or $Fe_3O_4$ having Co, Zn or other metals in solid solution; ferromagnetic chromium dioxides such as $CrO_2$ or $CrO_2$ having metal elements (e.g., Li, Na, Sn, Pb, Fe, Co, Ni and Zn) or halogen atom in solid solution; and magnetic metals such as metals (e.g., Fe, Co and Ni) or alloys thereof. The magnetic metals are particularly preferred for the purposes of this invention since they provide a magnetic recording medium having high saturation magnetization ($\sigma$s), coercive force (Hc) and achieve high S/N ratio and high-density recording. The fine particles of these ferromagnetic metals can be produced by the following methods to which this invention is by no means limited:

(1) An organic acid salt of a ferromagnetic metal is hydrolyzed and reduced with a reducing gas;
(2) Acicular particles of oxyhydroxide, or oxyhydroxide containing a dissimilar metal, or acicular particles of iron oxide derived from these oxyhydroxides are reduced;
(3) A ferromagnetic metal is evaporated in an inert gas;
(4) A metal carbonyl compound is thermally decomposed;
(5) Particles of ferromagnetic metal are electrodeposited on a mercury cathode from which they are then separated; and
(6) A salt of a metal capable of forming a ferromagnetic material in aqueous solution is reduced with a reducing material (e.g., borohydride, hypophosphite or hydrazine) to provide ferromagnetic particles.

Ferromagnetic metal particles having an oxide coating on their surface to improve their chemical stability can also be used in this invention.

Organic solvents can be used as the coating solvent. Examples of useful coating solvents include ketones such as methyl ethyl ketone and cyclohexanone; alcohols; esters such as ethyl acetate and butyl acetate; cellosolves; ethers; aromatic solvents such as toluene; and chlorinated hydrocarbon solvents such as carbon tetrachloride and chloroform, with ketones and esters being preferred.

Examples of useful lubricants include silicone oils such as various polysiloxanes; inorganic particles such as graphite and molybdenum disulfide; fine particles of plastics such as polyethylene and polytetrafluoroethylene; higher aliphatic acids, higher alcohols, higher aliphatic acid esters and fluorocarbons. Of these, higher aliphatic acids and esters thereof are preferred. The lubricant is used in an amount of from 0.1 to 20 parts by weight per 100 parts by weight of the binder.

Examples of useful abrasives include fine particles of fused alumina, silicon carbide, chromium oxide ($Cr_2O_3$), corundum and diamond having an average size of 0.05 to 0.5μ. The abrasive is used in an amount of from 0.5 to 20 parts by weight per 100 parts by weight of the binder.

Examples of useful antistatic agents include electrically conductive particles such as those of graphite, carbon black and carbon black graft polymer; nonionic surfactants; anionic surfactants and cationic surfactants.

Examples of useful non-magnetic bases include synthetic resins (e.g., polyester, polyamide, polyolefin, and cellulosic derivative), non-magnetic metals, glass, ceramics and paper. The base is used in the form of a film, tape, sheet, card, disc, drum and other suitable forms.

The magnetic particles, the titanate coupling agent described above, dispersant, lubricant, abrasive, antistat and solvent are mixed to form a magnetic paint. The paint composition is prepared by charging a mixer with the magnetic particles and all other ingredients simultaneously or sequentially. Various mixers may be used to achieve thorough mixing of the ingredients. For more details, see T. C. Patton, *Paint Flow and Pigment Dispersion*, John Wiley & Sons, 1964.

A magnetic coating can be formed on the base from the magnetic paint by various methods. The details of such methods are described in *Coating Kogaku* (*Coating Engineering*), published by Asakura Shoten, 1971.

The magnetic coating thus-formed on the base is dried after the magnetic particles in the coating are optionally oriented in a magnetic field. If it is necessary to provide improved magnetic properties, the coating may be passed through a smoothing step (e.g., smoothing before drying or calendering after drying).

This invention is now described in greater detail by reference to the following examples which are given here for illustrative purposes only and are by no means intended to limit the scope of the invention.

EXAMPLES 1 TO 8

Acicular particles of α-FeOOH containing 5 wt% cobalt were decomposed with heat to produce α-$Fe_2O_3$ particles which were reduced with hydrogen to form black ferromagnetic particles. The resulting particles were immersed in toluene containing 1 wt% of the particulate titanate coupling agents indicated in Table 1, and left to stand overnight after stirring, and then filtered and dried.

COMPARATIVE EXAMPLE 1

The procedures of Examples 1 to 8 were repeated except that the metal particles were treated with toluene containing no titanate coupling agent.

The magnetic particles prepared in Examples 1 to 8 and Comparative Example 1 were left to stand at 60° C. and 90% RH (relative humidity) and any decrease in their saturation flux density (σs) was measured. The results are shown in Table 1.

TABLE 1

| Run No. | Titanate Coupling Agent | Percent Reduction in Saturation Flux Density (σs) |
|---|---|---|
| Example 1 | Isopropyl triisostearoyltitanate | 10 |
| Example 2 | Isopropyl trioctanoyltitanate | 11 |
| Example 3 | Isopropyl tri(dioctylpyrophosphate)titanate | 13 |
| Example 4 | Isopropyl tri(octylbutylpyrophosphate)titanate | 10 |
| Example 5 | Di(octylpyrophosphate)oxyacetatetitanate | 10 |
| Example 6 | Di(octylpyrophosphate)ethylenetitanate | 12 |
| Example 7 | Isopropyl tri(N—ethylamino-ethylamino)titanate | 10 |
| Example 8 | Isopropyl tri(dodecylbenzenesulfonyl)titanate | 50 |
| Comparative Example 1 | None | 26 |

As is clear from Table 1, the titanate coupling agent according to this invention is effective in reducing the time-dependent deterioration of the magnetic properties. But the sulfur-containing titanate derivative of Example 8 is not preferred since it has no such effect.

EXAMPLES 9 TO 16

Three hundred parts each of the ferromagnetic particles prepared in Examples 1 to 8 and a composition having the following formulation were placed in a ball mill where they were mixed thoroughly for 15 hours.

| | |
|---|---|
| Polyester polyurethane (reaction product of ethylene adipate and 2,4-tolylenediisocyanate) | 20 parts |
| OH-containing vinyl chloride/vinyl acetate copolymer ("VAGH" of Union Carbide Corp.) | 30 parts |
| Carbon black (av. particle size = 170 Å) | 20 parts |
| Dimethyl polysiloxane (D.P. ≈ 60) | 6 parts |
| Butyl acetate | 500 parts |
| Methyl isobutyl ketone | 300 parts |

To the mixture, there was added 25 parts of a 75 wt% ethyl acetate solution of a triisocyanate compound ("Desmodule L-75" of Bayer A.G.), and the resulting mixture was stirred by a high-speed shear disperser for 1 hour to provide a magnetic coating solution.

The coating solution was applied to one surface of a polyethylene terephthalate film, and placed in a magnetic field for orientation, and slit into a magnetic tape having a predetermined width.

EXAMPLE 17

A magnetic tape was prepared as in Examples 9 to 16 except that 3 parts of a titanate coupling agent (isopropyl triisostearoyl titanate) was added to a magnetic paint composition containing the metal particles prepared in Comparative Example 1.

COMPARATIVE EXAMPLE 2

A magnetic tape was prepared as in Examples 9 to 16 except that the metal particles prepared in Comparative Example 1 were used.

The magnetic properties of the magnetic tape samples prepared in Examples 9 to 17 and Comparative Example 2 were measured by a vibrating flux meter (Model VSM-III of Toei Kogyo K.K.). The samples were left to stand at 60° C. and 90% RH and any reduction in their saturation flux density (Bm) was measured. The surface properties of each tape was checked both visually and by measuring the specular reflectance. The results are shown in Table 2 below.

TABLE 2

| Run No. | Titanate Coupling Agent | Squareness Ratio | Percent Reduction in Saturation Flux Density (Bm) | Surface Properties |
| --- | --- | --- | --- | --- |
| Example 9 | Isopropyl triisostearoyltitanate | 0.84 | <1 | Very good |
| Example 10 | Isopropyl trioctanoyltitanate | 0.85 | <1 | " |
| Example 11 | Isopropyl tri(dioctylpyrophosphate)titanate | 0.84 | 2 | " |
| Example 12 | Isopropyl tri(octylbutylpyrophosphate)titanate | 0.83 | <1 | " |
| Example 13 | Di(octylpyrophosphate)oxyacetatetitanate | 0.84 | 1 | " |
| Example 14 | Di(octylpyrophosphate)ethylenetitanate | 0.84 | <1 | " |
| Example 15 | Isopropyl tri(N—ethylamino-ethylamino)titanate | 0.85 | <1 | " |
| Example 16 | Isopropyl tri(dodecylbenzenesulfonyl)titanate | 0.78 | 10 | Good |
| Example 17 | Isopropyl triisostearoyltitanate | 0.82 | 3 | " |
| Comparative Example 2 | None | 0.80 | 5 | " |

The above results show that the titanate coupling agents according to this invention are effective in providing a uniform dispersion of magnetic particles and a magnetic coating having good surface properties. Comparison between Examples 9 and 17 demonstrates that a better result is obtained by treating the surface of magnetic particles with the titanate coupling agent rather than by incorporating the agent in the magnetic coating. The sulfur-containing titanate derivative of Example 16 is also less effective in providing a uniform dispersion of magnetic particles.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic base; and
   an overlying magnetic coating on said base, said coating comprising ferromagnetic particles dispersed in a binder, wherein said coating further contains a mono- or bifunctional titanate coupling agent, and wherein said ferromagnetic particles are reacted with a non-sulfur-containing titanate coupling agent prior to incorporation of said particles in said binder.

2. A magnetic recording medium as claimed in claim 1, wherein said titanate coupling agent is present in an amount of from 0.01 to 10 wt% of the ferromagnetic particles.

3. A magnetic recording medium as claimed in claim 1, wherein said binder is a conventional thermoplastic resin, thermosetting resin, reactive resin, or a mixture thereof.

4. A magnetic recording medium as claimed in claim 1, wherein said ferromagnetic particles are ferromagnetic metal selected from the group consisting of Fe, Co, Ni and alloys thereof.

5. A magnetic recording medium as claimed in claim 1, wherein said non-magnetic base comprising a material selected from the group consisting of synthetic resins, non-magnetic metals, glass, ceramics, and paper.

6. A magnetic recording medium as claimed in claim 1, wherein said titanate coupling agent is selected from the group consisting of isopropyl triisostearoyltitanate, isopropyl trioctanoyltitanate, isopropyl diisostearoylcumylphenyltitanate, isopropyl distearoylmethacryltitanate, isopropyl dimethacrylisostearoyltitanate, isopropyl tridodecylbenzenesulfonyltitanate, isopropyl diisostearoylacryltitanate, isopropyl isostearoyldiacryltitanate, isopropyl tri(dioctylphosphate)titanate, isopropyl tri-n-stearoyltitanate, isopropyl 4-aminobenzenesulfonyl-di(dodecylbenzenesulfonyl)titanate, isopropyl trimethacrylonitrile, isopropyl tricumylphenyltitanate, isopropyl di(4-aminobenzoyl)isostearoyltitanate, isopropyl tri(dioctylpyrophosphate)titanate, isopropyl triacryltitanate, isopropyl tri(N,N-dimethylethylamino)titanate, isopropyl tri(N-ethylaminoethylamino)titanate, isopropyl trianthranyltitanate, isopropyl tri(octylbutylpyrophosphate)titanate, isopropyl tri(butylmethylpyrophosphate)titanate, diisostearoyl oxyacetatetitanate, isostearoyl methacryloxyacetatetitanate, isostearoyl acryloxyacetatetitanate, di(dioctylphosphate)oxyacetatetitanate, 4-aminobenzenesulfonyldodecylbenzenesulfonyloxyacetatetitanate, dimethacryloxyacetatetitanate, dicumylphenolateoxyacetatetitanate, 4-aminobenzoylisostearoyloxyacetatetitanate, di(dioctylpyrophosphate)oxyacetatetitanate, diacryloxyacetatetitanate, di(octylbutylpyrophosphate)oxyacetatetitanate, diisostearoylethylenetitanate, isostearoylmethacrylethylenetitanate, di(dioctylphosphate)ethylenetitanate, 4-aminobenzenesulfonyldodecylbenzenesulfonylethylenetitanate, dimethacrylethylenetitanate, 4-aminobenzenesulfonylisostearoylethylenetitanate, di(dioctylpyrophosphate)ethylenetitanate, diacrylethylenetitanate, dianthranylethylenetitanate, and di(butylmethylpyrophosphate)ethylenetitanate.

* * * * *